(12) United States Patent
Chen et al.

(10) Patent No.: US 11,456,014 B1
(45) Date of Patent: Sep. 27, 2022

(54) REPEATABLE RUNOUT COMPENSATION VALUE GENERATION

(71) Applicant: Western Digital Technologies, Inc., San Jose, CA (US)

(72) Inventors: Zaifeng Chen, Rancho Palos Verdes, CA (US); Chuanwen Ji, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/494,825

(22) Filed: Oct. 5, 2021

(51) Int. Cl.
*G11B 5/596* (2006.01)
*G11B 20/10* (2006.01)

(52) U.S. Cl.
CPC .............................. *G11B 20/10388* (2013.01)

(58) Field of Classification Search
None
See application file for complete search history.

(56) References Cited

U.S. PATENT DOCUMENTS

| | | | | |
|---|---|---|---|---|
| 6,392,834 B1* | 5/2002 | Ellis | .................. | G11B 5/59627 360/77.03 |
| 6,493,173 B1* | 12/2002 | Kim | .................. | G11B 5/59627 360/77.04 |
| 6,563,663 B1* | 5/2003 | Bi | ...................... | G11B 5/59627 360/77.04 |
| 6,577,463 B1* | 6/2003 | Frees | ................. | G11B 5/59655 360/77.08 |
| 7,286,317 B1* | 10/2007 | Li | ...................... | G11B 5/59627 360/77.04 |
| 2004/0264032 A1* | 12/2004 | Baum | ................ | G11B 5/59627 360/77.04 |
| 2005/0180042 A1* | 8/2005 | Baek | .................. | G11B 5/59627 360/77.02 |
| 2006/0056100 A1* | 3/2006 | Takaishi | ............ | G11B 5/59627 360/77.04 |

(Continued)

OTHER PUBLICATIONS

Western Digital, Technical Brief: Reimagining HDDs with OptiNAND™ Technology, Aug. 2021, 5 pages, Western Digital Corporation, downloaded at https://documents.westerndigital.com/content/dam/doc-library/en_us/assets/public/western-digital/collateral/tech-brief/tech-brief-reimagining-hdds-with-optinand-technology.pdf.

*Primary Examiner* — Peter Vincent Agustin
(74) *Attorney, Agent, or Firm* — John D. Henkhaus (57) ABSTRACT

Generating a hard disk drive (HDD) data track repeatable runout (RRO) compensation value for a target track involves querying at least one RRO table for a closest track to the target track external servo target (EST) and identifying an $EST_x$ corresponding to the closest track, computing a first absolute value of the difference between the EST and the $EST_x$, and responsive to the first absolute value being less than an approximation threshold, setting the RRO compensation value for the target track to the RRO compensation value for the closest track. Else, querying the RRO table(s) for each adjacent track to the target track, computing the difference between the ESTs for the adjacent tracks, and responsive to the second absolute value being less than an interpolation threshold, determining an RRO compensation value for the target track based on RRO compensation values corresponding to the adjacent tracks.

22 Claims, 4 Drawing Sheets

(56) References Cited

U.S. PATENT DOCUMENTS

2008/0239554 A1* 10/2008 Takeda ............... G11B 5/59633
360/77.02
2011/0279924 A1* 11/2011 Albrecht ................ B82Y 10/00
360/234.3

* cited by examiner

REPEATABLE RUNOUT COMPENSATION VALUE GENERATION

FIELD OF EMBODIMENTS

Embodiments of the invention may relate generally to data storage devices such as hard disk drives and particularly to approaches to generating repeatable runout (RRO) compensation values for target tracks.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write transducer (or read-write "head") that is positioned over a specific location of a disk by an actuator. A read-write head makes use of magnetic fields to write data to, and read data from, the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

Increasing areal density (a measure of the quantity of information bits that can be stored on a given area of disk surface) is one of the ongoing goals of HDD technology evolution, and has led to the necessary development and implementation of various means for reducing the disk area needed to record a bit of information. In one form, this goal manifests in the use of a recording paradigm referred to as shingled magnetic recording (SMR), in which the data tracks are written to disk sequentially in a partially overlapping manner similar to shingles on a roof. Furthermore, so-called "XMR" HDDs are being developed which can be used in both CMR (conventional magnetic recording) and SMR modes.

With SMR, high areal density can be obtained without reducing the strength of the recording magnetic field by using a recording head which is wider than the track pitch. During recording of a given track, the track is recorded while overwriting one side of the adjacent recording pattern that has already been recorded. Recording tracks are successively formed while always overwriting the recording pattern on the same side. As a result, the effective recording track width in the SMR system is the width of the recording pattern formed by the recording head, less the width of the portion which has been overwritten and deleted by the adjacent track. Therefore, the width of the main pole of the recording head in the SMR system need not match the width of the recording track, and a recording head having a wider pole width than the effective recording track width can be used.

As recording tracks in HDDs become narrower and narrower and bits are recorded smaller and smaller, there is a need for more accurate and sustainable head positioning, sometimes referred to as "track following". One of the factors impairing precise track following is repeatable runout (RRO), which generally refers to the deviation of the head from the theoretical perfect circle of the track, and is a portion of the position error signal (PES) that is repeatable for every spindle revolution. Modern HDDs include servo systems that read and interpret servo bursts on the disk tracks, which contain special data that the head reads and the servo system firmware interprets to determine to which track the head is closest and how far off track center the head is.

In HDD manufacturing, RRO needs to be calibrated on every track for each type of track to improve servo performance (e.g., RRO compensation) and to assist in achieving areal density goals. For XMR drives, there are four "types" of tracks needing RRO calibration: (i) CMR Write track, (ii) CMR Read track, (iii) SMR Write track, and (iv) SMR Read track. The calibration of RRO is time consuming, in that it entails systematically seeking to each track to collect at least one revolution of relevant track information and to compute a corresponding RRO compensation value for the track. Thus, the process of calibrating RRO on all tracks of all recording types takes a significantly long time and consequently increases cost accordingly.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Generally, approaches to generating repeatable runout (RRO) compensation values are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall that RRO needs to be calibrated on every track for each type of track to improve servo performance (e.g., RRO compensation) and to assist in achieving areal density goals, and that RRO calibration is a time consuming and costly process in that it entails systematically seeking to each track to collect at least one revolution of relevant track information (e.g., position error signal, or "PES") and to compute and store to persistent storage (i.e., non-volatile storage such as magnetic media) a corresponding RRO compensation value for the track. This is especially true in the context of XMR drives, in which there are four "types" of tracks (or "profiles") needing RRO calibration: (i) CMR Write track, (ii) CMR Read track, (iii) SMR Write track, and (iv) SMR Read track. Particularly, the RRO compensation data may be computed for each sector of each track while saving/storing the data on a per-track basis, where multiple tracks of RRO data can be stored in one data block. Traditionally, HDD manufacturing and/or test processes include one or more RRO calibration procedures dedicated to generating RRO compensation values for the various types of tracks.

Generating a Repeatable Runout Compensation Value

Figure 2A:
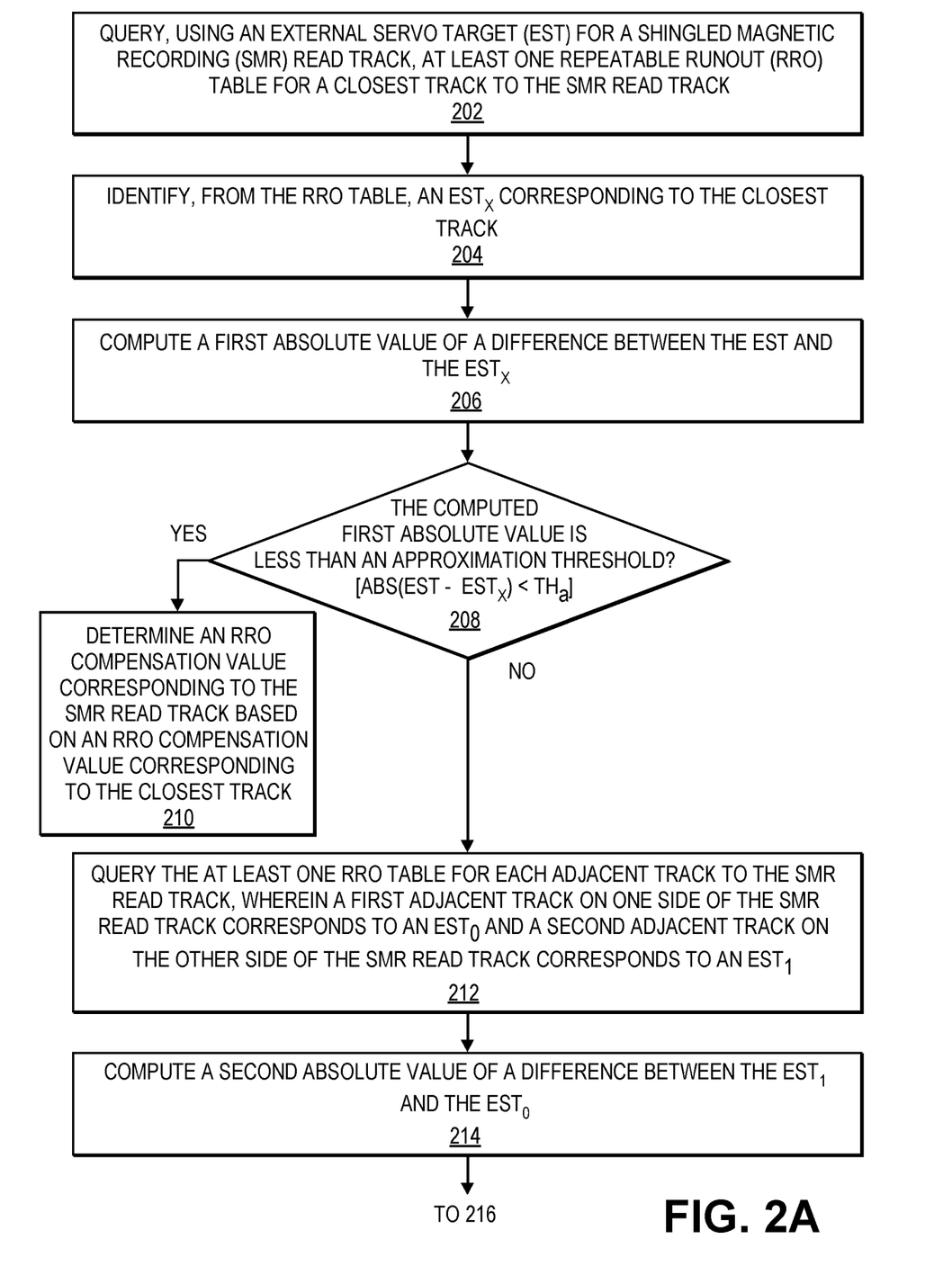
FIGS. 2A-2B are a flow diagram illustrating a method for generating a hard disk drive (HDD) data track repeatable runout (RRO) compensation value, according to an embodiment.
Figure 2B:
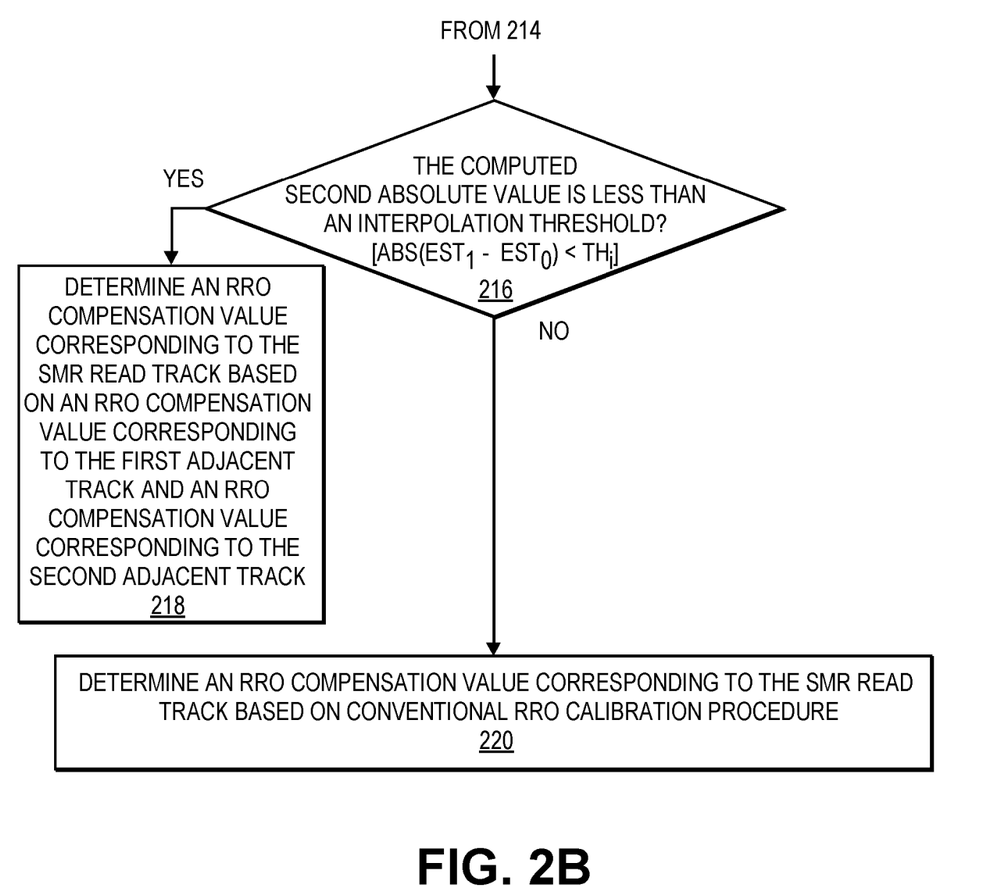
Figure 3:
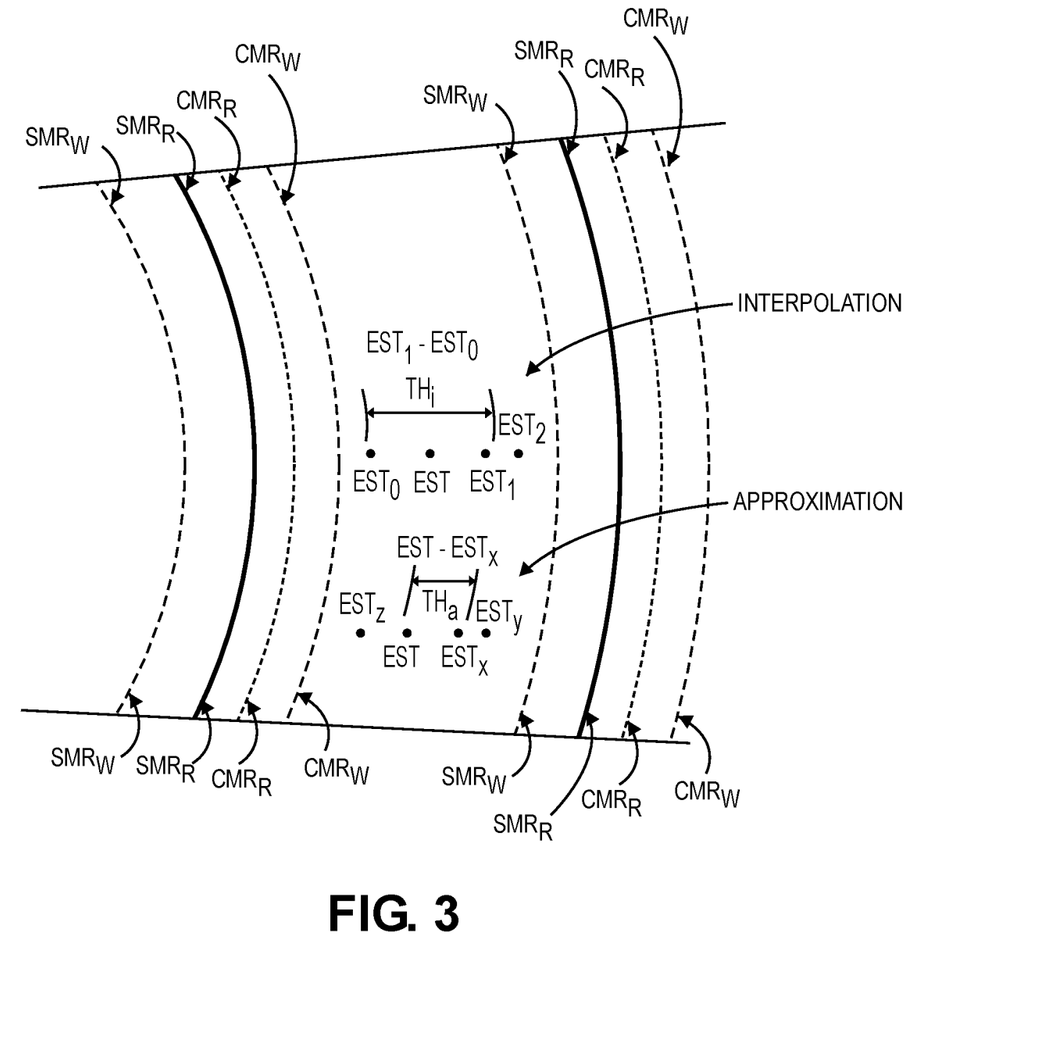
FIG. 3 is a diagram illustrating a group of data tracks, according to an embodiment.

FIGS. 2A-2B are a flow diagram illustrating a method for generating a hard disk drive (HDD) data track repeatable runout (RRO) compensation value, according to an embodiment. FIG. 3 is a diagram illustrating a group of data tracks, according to an embodiment. FIG. 3 is used here to augment the description of the method of FIGS. 2A-2B, and is for example purposes and not purported to be drawn to scale. The process of FIGS. 2A-2B is described in the context of for a shingled magnetic recording (SMR) Read track, according to an embodiment. However, the type of target track may vary from implementation to implementation, and the embodiments described herein in reference to an SMR Read track are for purposes of example. Preferably, the type of target track for which this method is applied is the final type of track being processed during RRO calibration.

HDDs use a servo-mechanical control system to position the read-write heads to the desired data tracks and to maintain the heads on the tracks as required for read and write operations, e.g., "track following". Head-positioning (or "servo") information is written in circumferentially-spaced servo sectors in each of the concentric data tracks on each disk surface. The servo pattern is constructed across multiple tracks so that the read-back signal from the head, as it passes over the pattern, can be decoded to yield a head position error signal (PES) that is used by the control system to maintain the head on the track during data reading and writing.

At block 202, using an external servo target (EST) for the SMR Read track (e.g., the "target track" or "given track"), query at least one RRO table for a closest track to the SMR Read track. The EST characterizes the location on the disk at which the servo control system utilizes as the target position for a given track (or a "servo position value"). According to an embodiment, the at least one RRO table comprises (i) an RRO table of conventional magnetic recording (CMR) Write track RROs, (ii) an RRO table of CMR Read track RROs, and (iii) an RRO table of SMR Write track RROs. For example, each of the RRO tables (i)-(iii) is queried to find the closest $EST_x$ to the EST of the given SMR read track, $SMR_R$ (FIG. 3), for example, using the EST of $SMR_R$ as a key value for an index into each lookup table. Note that if the target track is a type of track other than an SMR Read track (e.g., an SMR Write track, a CMR Read track, a CMR Write track), then the at least one RRO table would comprise, according to this embodiment, the RRO tables except for the RRO table corresponding to the given track type (e.g., the RRO tables for the types of tracks that have already been calibrated).

At block 204, identify an $EST_x$ corresponding to the closest track from the at least one RRO table. For example, the $EST_x$ of $CMR_R$ track (FIG. 3) is identified as the closest track to the EST of $SMR_R$ track, i.e., closer than the $EST_y$ of $CMR_W$ track and closer than the $EST_z$ of the $SMR_W$ track (FIG. 3). Functionally or programmatically, blocks 202 and 204 may be combined effectively as a single operation, i.e., the result of querying at block 202 is identification of the $EST_x$ corresponding to the closest track to the $SMR_R$ track.

At block 206, compute the absolute value of the difference between the EST and the $EST_x$ ("first absolute value"). For example, the absolute value of the difference between the EST and the $EST_x$, abs(EST−$EST_x$), is computed (FIG. 3).

At decision block 208, determine if the computed first absolute value is less than an approximation threshold. For example, is the abs(EST−$EST_x$) computed at block 206 less than approximation threshold $TH_a$ (FIG. 3). For example and according to an embodiment, the approximation threshold $TH_a$ is within a range consisting of 3%-10% of the nominal non-adjusted (or "non-compensated") servo track width (or simply "track width") (see, e.g., $TH_a$ of FIG. 3, not drawn to scale). Stated otherwise, at decision block 208, abs(EST−$EST_x$)<$TH_a$ is determined. As an implementation matter, the determination at decision block 208 may just as well be programmed to be abs(EST−$EST_x$)<=$TH_a$ and still fall within the scope of embodiments.

In response to the computed first absolute value being less than the approximation threshold at decision block 208, at block 210 responsively determine an RRO compensation value corresponding to the SMR Read track based on an RRO compensation value corresponding to the closest track. For example, if abs(EST−$EST_x$)<$TH_a$ is true (YES), then the RRO compensation value corresponding to the SMR Read track ($SMR_R$) is set as the RRO compensation value corresponding to the closest track ($CMR_R$) (FIG. 3), where the RRO compensation value corresponding to the $CMR_R$ track is identified from the at least one RRO table.

Continuing with the given SMR Read track $SMR_R$, in response to the computed first absolute value being greater than or equal to the approximation threshold (NO) at decision block 208, at block 212 responsively query the at least one RRO table for each adjacent track to the SMR Read track, wherein a first adjacent track on one side of the SMR Read track corresponds to an $EST_0$ and a second adjacent track on the other side of the SMR Read track corresponds to an $EST_1$, and where $EST_0<EST<EST_1$. As described, for XMR drives there are four "types" of tracks needing RRO calibration: (i) CMR Write track, (ii) CMR Read track, (iii) SMR Write track, and (iv) SMR Read track. The relative positions of these tracks on the recording disk are effectively overlaid on each other and thus overlap in part, while another portion(s) of a given track may effectively extend beyond the boundary of another "overlapping" track (see, e.g., the various types of tracks illustrated in FIG. 3). Furthermore, the different track types may vary in width. Hence, each track centerline (represented by a respective EST) is likely to vary from a track centerline of one or more of the other types of overlapping tracks. Therefore as an example of block 212, each of the RRO tables (i)-(iii) is queried to find each adjacent track to the $SMR_R$ track, wherein a first adjacent track on one side of $SMR_R$ corresponds to an $EST_0$ (in this example, $EST_z$ of the $SMR_W$ track; see FIG. 3) and a second adjacent track on the other side of $SMR_R$ corresponds to an $EST_1$ (in this example, $EST_x$ of the $CMR_R$ track; see FIG. 3), for example. Here, "adjacent tracks" refers to tracks whose ESTs are adjacent (e.g., the next one in each direction) in one radial direction or the other (e.g., toward the inner diameter (ID) or toward the outer diameter (OD)). For example with reference to FIG. 3, $EST_z$ and $EST_x$ are adjacent to EST, EST and $EST_y$ are adjacent to $EST_x$, $EST_0$ and $EST_1$ are adjacent to EST, EST and $EST_2$ are adjacent to $EST_1$, and so on.

At block 214, compute the absolute value of a difference between the $EST_1$ and the $EST_0$ ("second absolute value"). For example, the absolute value of the difference between the $EST_1$ and the $EST_0$, $abs(EST_1-EST_0)$, is computed (FIG. 3).

At decision block 216, determine if the computed second absolute value is less than an interpolation threshold. For example, is the $abs(EST_1-EST_0)$ computed at block 214 less than interpolation threshold $TH_i$ (FIG. 3). For example and according to an embodiment, the interpolation threshold $TH_i$ is within a range consisting of 25%-60% of the nominal non-adjusted (or "non-compensated") servo track width (or simply "track width") (see, e.g., $TH_i$ of FIG. 3, not drawn to scale). Stated otherwise, at decision block 216, $abs(EST_1-EST_0)<TH_i$ is determined. As an implementation matter, the determination at decision block 216 may just as well be programmed to be $abs(EST_1-EST_0)<=TH_i$ and still fall within the scope of embodiments.

In response to the computed second absolute value being less than the interpolation threshold at decision block 216, at block 218 responsively determine an RRO compensation value corresponding to the SMR Read track based on an RRO compensation value corresponding to the first adjacent track and an RRO compensation value corresponding to the second adjacent track. For example and according to an embodiment, if $abs(EST_1-EST_0)<TH_i$ is true (YES), then the RRO compensation value corresponding to the SMR Read track ($SMR_R$), RRO(EST), is computed as:

$$RRO(EST)=RRO(EST_0)+(RRO(EST_1)-RRO(EST_0))\\*(EST-EST_0)/(EST_1-EST_0). \quad [EQ. 1]$$

Whether the RRO compensation value corresponding to a subject SMR Read track is determined at block 210 or at block 218 may vary from track to track, based on the foregoing method of FIGS. 2A-2B.

Based on the foregoing method of FIGS. 2A-2B, overall RRO calibration processing time can be significantly reduced, especially in accordance with selection of reasonable approximation ($TH_a$) and interpolation ($TH_i$) thresholds. For example, simulation has shown that with use of a 0.05 approximation threshold and a 0.6 interpolation threshold, manufacturing test time associated with the RRO calibration process in XMR type HDDs may be reduced on the order of 60%.

If at decision block 216 the computed second absolute value is greater than or equal to the interpolation threshold value (NO), then at block 220 the RRO compensation value corresponding to the $SMR_R$ track may be determined based on conventional RRO calibration procedure(s) established and known to those in the art.

According to an embodiment, the RRO compensation value corresponding to the SMR Read track is written to a non-volatile memory, such as NAND (NOT AND) flash memory. For example, for a given SMR Read track the $SMR_R$ track RRO compensation value determined at block 210 or the $SMR_R$ track RRO compensation value determined at block 218 is stored in/on a NAND flash memory component such as NAND flash memory 190 (FIG. 1) constituent to a data storage device such as a hard disk drive (see, e.g., HDD 100 of FIG. 1). In a scenario in which the RRO compensation data is stored in NAND, a corresponding data query can be executed very quickly.

Physical Description of an Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

Figure 1:
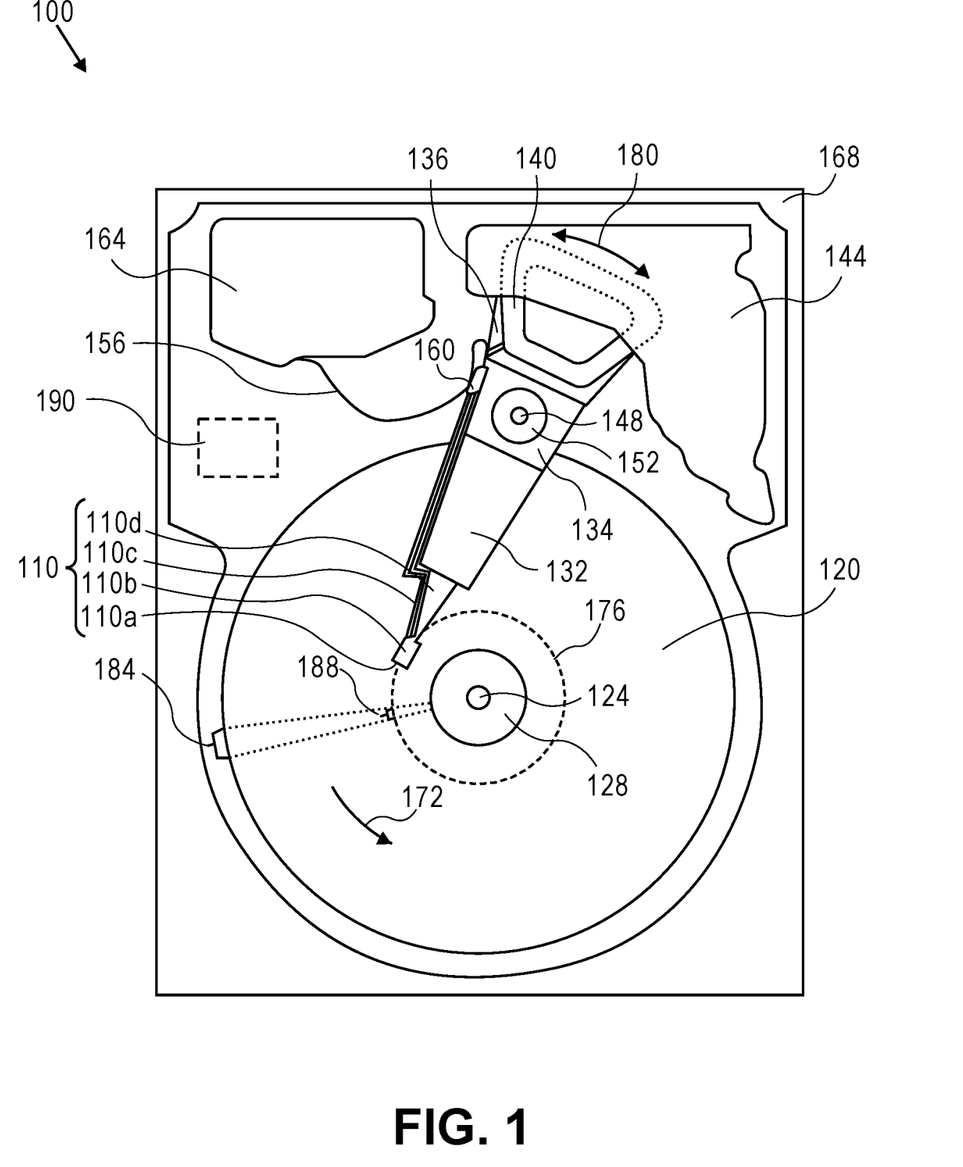
FIG. 1 is a plan view illustrating a hard disk drive (HDD), according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168. According to an embodiment, the electronic components include a NAND flash memory 190 component or circuitry. NAND flash memory 190 may be configured to store multiple bits within a single NAND cell. Single Level Cell (SLC) stores one bit/cell, while Triple Level Cell (TLC) can store 3 bits/cell. SLC offers higher performance, higher program-erase (P/E) cycles and higher data retention margins compared to TLC, which enables 3× storage in the same footprint as SLC. Application of this NAND technology can enable both SLC for write-heavy operations and TLC for read-heavy operations in the same device.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A method for generating a hard disk drive (HDD) data track repeatable runout (RRO) compensation value, the method comprising:
for a given track being processed to determine a corresponding RRO compensation value:
querying, using an external servo target (EST) corresponding to the given track, at least one RRO table for a closest track to the given track;
identifying from the at least one RRO table an $EST_x$ corresponding to the closest track;
computing a first absolute value of a difference between the EST and the $EST_x$;
in response to determining that the computed first absolute value is less than an approximation threshold, determining an RRO compensation value corresponding to the given track based on an RRO compensation value corresponding to the closest track.

2. The method of claim 1, further comprising, for the given track:
in response to determining that the computed first absolute value is greater than or equal to the approximation threshold:
querying the at least one RRO table for each adjacent track to the given track, wherein a first adjacent track on one side of the given track corresponds to an $EST_0$ and a second adjacent track on the other side of the given track corresponds to an $EST_1$;
computing a second absolute value of a difference between the $EST_1$ and the $EST_0$;
in response to determining that the computed second absolute value is less than an interpolation threshold, determining an RRO compensation value corresponding to the given track based on an RRO compensation value corresponding to the first adjacent track and an RRO compensation value corresponding to the second adjacent track.

3. The method of claim 2, wherein the RRO compensation value corresponding to the given track is computed as:

$$RRO(EST)=RRO(EST_0)+(RRO(EST_1)-RRO(EST_0))*(EST-EST_0)/(EST_1-EST_0).$$

4. The method of claim 2, wherein the interpolation threshold is within a range consisting of 25%-60% of a nominal track width.

5. The method of claim 2, wherein the given track is a shingled magnetic recording (SMR) Read track and the at least one RRO table comprises (i) an RRO table of conventional magnetic recording (CMR) Write track RROs, (ii) an RRO table of CMR Read track RROs, and (iii) an RRO table of SMR Write track RROs.

6. The method of claim 2, further comprising:
writing to a non-volatile flash memory the RRO compensation value corresponding to the given track.

7. The method of claim 1, wherein the approximation threshold is within a range consisting of 3%-10% of a nominal track width.

8. The method of claim 1, wherein the given track is one from a type group consisting of a shingled magnetic recording (SMR) Read track, an SMR Write track, a conventional magnetic recording (CMR) Read track, and a CMR Write track, and the at least one RRO table comprises the RRO tables, except for the RRO table corresponding to the given track type, from a group consisting of (i) an RRO table of CMR Write track RROs, (ii) an RRO table of CMR Read track RROs, (iii) an RRO table of SMR Write track RROs, and (iv) an RRO table of SMR Read track RROs.

9. The method of claim 1, further comprising:
writing to a non-volatile flash memory the RRO compensation value corresponding to the given track.

10. A non-transitory computer-readable medium storing one or more sequences of instructions which, when executed by one or more processors, cause performance of:
for a target track:
querying, using an external servo target (EST) corresponding to the target track, at least one repeatable runout (RRO) table for a closest track to the target track;
identifying from the RRO table an $EST_x$ corresponding to the closest track;
computing a first absolute value of a difference between the EST and the $EST_x$;
in response to determining that the computed first absolute value is less than an approximation threshold, determining an RRO compensation value corresponding to the target track based on an RRO compensation value corresponding to the closest track.

11. The computer-readable medium of claim 10, wherein the one or more sequences of instructions, when executed by the one or more processors, cause further performance of:
for the target track:
in response to determining that the computed first absolute value is greater than or equal to the approximation threshold:
querying the at least one RRO table for each adjacent track to the target track, wherein a first adjacent track on one side of the target track corresponds to an $EST_0$ and a second adjacent track on the other side of the target track corresponds to an $EST_1$;
computing a second absolute value of a difference between the $EST_1$ and the $EST_0$;
in response to determining that the computed second absolute value is less than an interpolation threshold, determining an RRO compensation value corresponding to the target track based on an RRO compensation value corresponding to the first adjacent track and an RRO compensation value corresponding to the second adjacent track.

12. The computer-readable medium of claim 11, wherein the RRO compensation value corresponding to the target track is computed as:

$$RRO(EST)=RRO(EST_0)+(RRO(EST_1)-RRO(EST_0))*(EST-EST_0)/(EST_1-EST_0).$$

13. The computer-readable medium of claim 11, wherein the interpolation threshold is within a range consisting of 25%-60% of a nominal track width.

14. The computer-readable medium of claim 11, wherein the target track is a shingled magnetic recording (SMR) Read track and the at least one RRO table comprises (i) an RRO table of conventional magnetic recording (CMR) Write track RROs, (ii) an RRO table of CMR Read track RROs, and (iii) an RRO table of SMR Write track RROs.

15. The computer-readable medium of claim 11, wherein the one or more sequences of instructions, when executed by the one or more processors, cause further performance of:
writing to a non-volatile flash memory the RRO compensation value corresponding to the target track.

16. A data storage device comprising the computer-readable medium of claim 11.

17. The computer-readable medium of claim 10, wherein the one or more sequences of instructions, when executed by the one or more processors, cause further performance of:
writing to a non-volatile flash memory the RRO compensation value corresponding to the target track.

18. The computer-readable medium of claim 10, wherein the approximation threshold is within a range consisting of 3%-10% of a nominal track width.

19. The computer-readable medium of claim 10, wherein:
the target track is one from a type group consisting of a shingled magnetic recording (SMR) Read track, an SMR Write track, a conventional magnetic recording (CMR) Read track, and a CMR Write track; and
the at least one RRO table comprises the RRO tables, except for the RRO table corresponding to the given track type, from a group consisting of (i) an RRO table of CMR Write track RROs, (ii) an RRO table of CMR Read track RROs, (iii) an RRO table of SMR Write track RROs, and (iv) an RRO table of SMR Read track RROs.

20. The computer-readable medium of claim 10, wherein the one or more sequences of instructions, when executed by the one or more processors, cause further performance of:
writing to a NAND (NOT AND) flash memory the RRO compensation value corresponding to the target track.

21. A data storage device comprising:
means for executing machine-executable instructions; and
means for storing one or more sequences of machine-executable instructions which, when executed by the means for executing machine-executable instructions, cause performance of:
for a target track:
querying, using a servo position value corresponding to the target track, at least one repeatable runout (RRO) table for a closest track to the target track;
identifying, from the at least one RRO table for the closest track, a servo position value corresponding to the closest track;
computing a first absolute value of a difference between (a) the servo position value corresponding to the target track and (b) the servo position value corresponding to the closest track;
in response to determining that the computed first absolute value is less than an approximation threshold, determining an RRO compensation value corresponding to the target track based on an RRO compensation value corresponding to the closest track.

22. The data storage device of claim 21, wherein the one or more sequences of instructions, when executed by the means for executing machine-executable instructions, cause further performance of:
for the target track:
in response to determining that the computed first absolute value is greater than or equal to the approximation threshold:
querying the at least one RRO table for each adjacent track to the target track, wherein a first adjacent track on one side of the target track is adjacent track A and a second adjacent track on the other side of the target track is adjacent track B;
computing a second absolute value of a difference between (a) a servo position value corresponding to adjacent track A and (b) a servo position value corresponding to adjacent track B;
in response to determining that the computed second absolute value is less than an interpolation threshold, determining an RRO compensation value corresponding to the target track based on an RRO compensation value corresponding to adjacent track A and an RRO compensation value corresponding to adjacent track B.

* * * * *